United States Patent
Alacoque

(10) Patent No.: US 8,787,455 B2
(45) Date of Patent: Jul. 22, 2014

(54) METHOD FOR ENTROPICALLY TRANSCODING A FIRST DATA STREAM INTO A SECOND COMPRESSED BINARY DATA STREAM, AND CORRESPONDING COMPUTER PROGRAM AND IMAGE RECORDING DEVICE

(75) Inventor: Laurent Alacoque, Voreppe (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 710 days.

(21) Appl. No.: 13/058,400

(22) PCT Filed: Sep. 4, 2009

(86) PCT No.: PCT/FR2009/051678
§ 371 (c)(1),
(2), (4) Date: Feb. 10, 2011

(87) PCT Pub. No.: WO2010/026351
PCT Pub. Date: Mar. 11, 2010

(65) Prior Publication Data
US 2011/0134258 A1   Jun. 9, 2011

(30) Foreign Application Priority Data
Sep. 5, 2008 (FR) ..................... 08 04893

(51) Int. Cl.
*H04N 9/04* (2006.01)
*H04N 7/26* (2006.01)
*H04N 7/30* (2006.01)

(52) U.S. Cl.
CPC ... *H04N 19/00121* (2013.01); *H04N 19/00139* (2013.01); *H04N 19/00309* (2013.01); *H04N 19/00818* (2013.01); *H04N 19/00836* (2013.01)
USPC ............ 375/240.11; 375/240.19; 348/207.99; 382/232

(58) Field of Classification Search
CPC .................. H04N 19/00121; H04N 19/00139; H04N 19/00309; H04N 19/00818; H04N 19/00836
USPC ........................ 382/232; 375/240.11, 240.19; 348/207.99
See application file for complete search history.

(56) References Cited

U.S. PATENT DOCUMENTS 6,477,280 B1    11/2002  Malvar
7,132,964 B2 *  11/2006  Tsuru .............................. 341/67
(Continued)

FOREIGN PATENT DOCUMENTS

EP    1 437 896    7/2004
(Continued)

OTHER PUBLICATIONS

French Search Report issued May 20, 2009, in Patent Application No. 0804893 (with English Translation of Category of Cited Documents).

(Continued)

*Primary Examiner* — Behrooz Senfi
*Assistant Examiner* — Maria Vazquez Colon
(74) *Attorney, Agent, or Firm* — Oblon, Spivak, McClelland, Maier & Neustadt, L.L.P.

(57) ABSTRACT

A method for entropic transcoding of a first sequence of binary data of words to transcode into a second compressed sequence of binary data uses a predetermined entropic code involving a variable-length of the encoded words to transcode each word of the first sequence of binary data into a transcoded word. Based on a predetermined number B of low-order bits, the method includes application to each word of the first sequence of binary data: subdivision of the word into first and second subwords, wherein the first subword includes the B low-order bits of the word, and the second subword includes the other high-order bits of the word, application of the predetermined entropic code to the second subword to obtain a second transcoded subword, and obtaining the transcoded word by concatenation of the first subword and of the second transcoded subword.

8 Claims, 4 Drawing Sheets

(56) References Cited

U.S. PATENT DOCUMENTS

Figure 1:
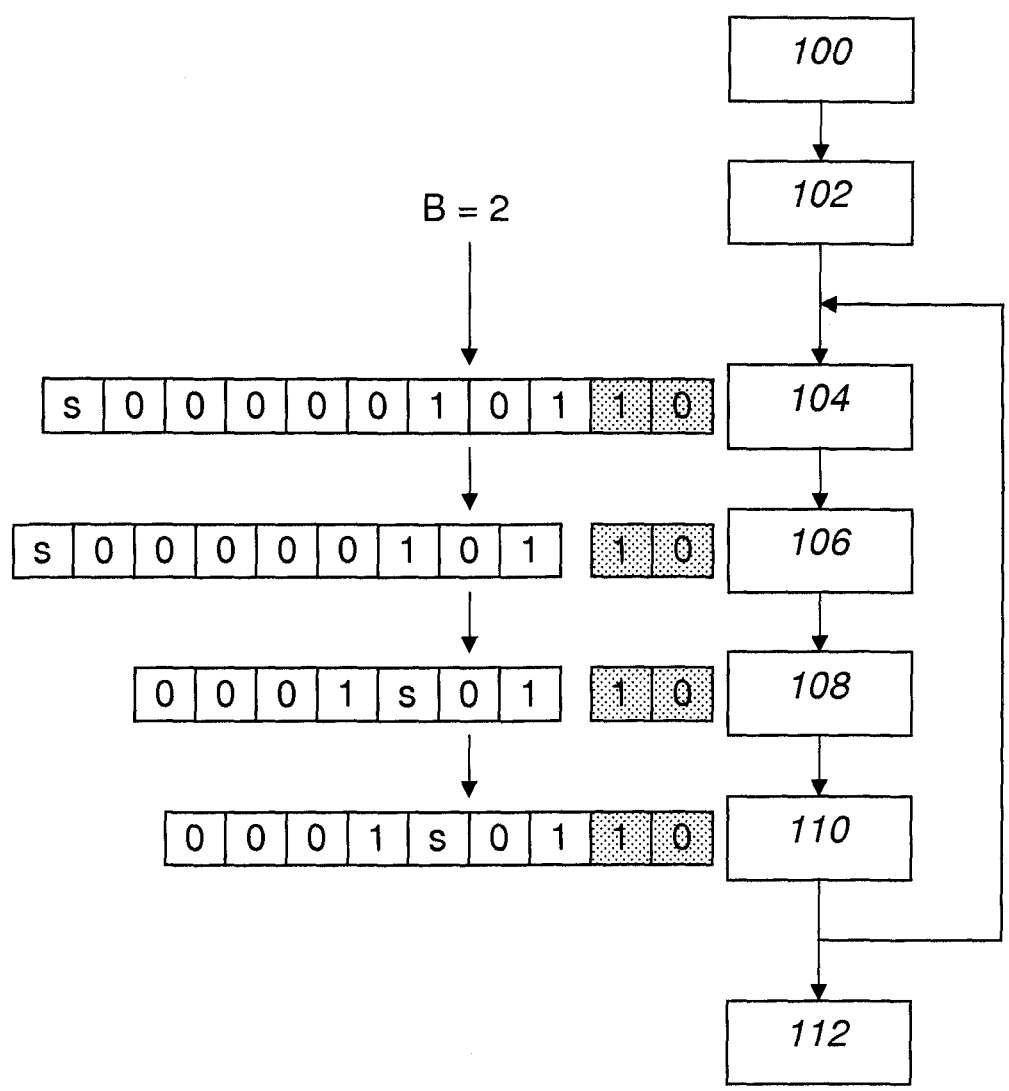

| | | |
|---|---|---|
| 7,983,500 B2 * | 7/2011 | Zeng et al. .................... 382/245 |
| 2004/0131117 A1 | 7/2004 | Sheraizin et al. |
| 2007/0053598 A1 | 3/2007 | Mizuno |
| 2007/0053599 A1 | 3/2007 | Mizuno |
| 2007/0053620 A1 | 3/2007 | Mizuno |
| 2007/0071090 A1 | 3/2007 | Peng et al. |

FOREIGN PATENT DOCUMENTS

| | | | |
|---|---|---|---|
| GB | 2360915 B * | 1/2004 | |
| WO | 2006 046334 | 5/2006 | |
| WO | 2007 039795 | 4/2007 | |
| GB | 2 360 915 | 10/2001 | |

OTHER PUBLICATIONS

International Search Report issued Dec. 17, 2009, in Patent Application No. PCT/FR2009/051678 (with English Translation of Category of Cited Documents).

International Search Report Issued Dec. 17, 2009 in PCT/FR09/051678 filed Sep. 4, 2009.

* cited by examiner

METHOD FOR ENTROPICALLY TRANSCODING A FIRST DATA STREAM INTO A SECOND COMPRESSED BINARY DATA STREAM, AND CORRESPONDING COMPUTER PROGRAM AND IMAGE RECORDING DEVICE

The present invention concerns a method for entropic transcoding of a first sequence of binary data into a second compressed sequence of binary data through the use of a predetermined entropic code involving a variable-length of the encoded words in order to transcode each word of the first sequence of binary data into a transcoded word. It also concerns a method for block-encoding implementing such a transcoding method. Finally, it also concerns a computer program comprising program code instructions and a device for capturing images designed to execute the steps of such a transcoding method.

The goal of the use of an entropic code is to transcode coefficients encoded as fixed-size binary words with variable probabilities into binary words of variable sizes: as predetermined by the entropic code, the values of the most probable coefficients are encoded over a small number of bits; on the contrary, the values of the least probable coefficients are encoded over a large number of bits.

The use of an entropic code in data compression is particularly suited to signals the statistical properties of which are predictable.

It is in particular the case of image, video and audio signals wherein spatial and/or temporal redundancy is high. Thus, statistically, the signals resulting from the difference of correlated samples from the real world, such as for example the difference between the successive samples of an image, video or audio signal, provide coefficients which are frequently close to zero, and rarer the further they are from zero in absolute value terms.

The coefficients derived from a decorrelating block-encoding, of the DCT-type ("Discrete Cosine Transform") or by decomposition in a base of wavelets, of a digital image or of a sequence of digital images generally verify this property.

Encoding by DCT, used in the JPEG and MPEG standards, is generally applied to square blocks of 8×8 pixels, and is then envisaged as a two-dimensional decomposition of each of these blocks into a base of 64 discrete sinusoidal functions with infinite support. The one-dimensional kernel of the vertical and horizontal projections accomplished by this encoding technique is a discrete cosine function over 8 pixels. Thus, by this DCT encoding, the image signal is decomposed in the frequencies space.

Encoding by decomposition into a base of wavelets with finite support, used in the JPEG 2000 standard, is also generally applied to square blocks of 8×8 pixels. A one-dimensional kernel of vertical and horizontal projections commonly used is a 2-pixel Haar kernel (i.e. the traditional Haar mother square-wave function). By application of this kernel horizontally and vertically, a first decomposition of an 8×8 block into four 4×4 blocks is accomplished. Then, in a second order, the 4×4 sub-block of the low frequencies is decomposed into four 2×2 sub-blocks. Finally, in a third order, the 2×2 sub-block of the low frequencies is decomposed into four pixels, one of which represents the continuous component of the block.

Other decomposition principles, for example into frequency sub-bands, are also conceivable. All these encodings aim at decorrelating the initial image or image sequence.

As a consequence, signals derived from an encoding of this type, available in the form of sequences of binary data consisting of successive words, each word including a sign bit and a constant predetermined number of bits to define the value of a corresponding coefficient, verify this statistics according to which the higher the coefficient value, the less probable this coefficient is.

Every type of predefined entropic code which attributes a number of bits which is smaller the closer the value of the coefficient for transcoding is to zero is thus particularly suited to these signals. Of course, the use of an entropic code will be more efficient the closer the statistics of the sequence of binary data on which it is applied is to the statistical model on which the entropic code has been designed.

There is thus provided a great number of various entropic codes more or less efficient according to the used decorrelating principle, so that the choice of an entropic code to perform a transcoding is generally dependent on how the initial image, video or audio signal has previously been decorrelated.

However, even if an entropic code is selected for its particular match with a given decorrelating encoding method, its efficiency can also vary with the nature of the initial signal. Indeed, such an entropic code is hard to accommodate with the real variability of statistics from real signals such as real images, videos or sounds, especially because of the noise present on the low-order bits of the coefficients obtained from unprocessed real signals. This noise hinders the statistical decay of encoded coefficients probabilities as a function of their increasing absolute value: it thus reduces the compression potential of the entropic code.

It may thus be desired to envisage a transcoding method which enables the abovementioned problems and constraints to be overcome.

An object of the invention is therefore a method for entropic transcoding of a first sequence of binary data consisting of words to transcode into a second compressed sequence of binary data through the use of a predetermined entropic code involving a variable-length of the encoded words in order to transcode each word of the first sequence of binary data into a transcoded word, including, on the basis of a predetermined number, noted B, of low-order bits considered as representative of a noise level of the words of the first sequence of binary data, the application of the following steps to each word of the first sequence of binary data:

subdivision of the word into first and second subwords, where the first subword comprises the B low-order bits of the word, and the second subword comprises the other high-order bits of the word, application of the predetermined entropic code to the second subword in order to obtain a second transcoded subword, and obtaining the said transcoded word by concatenation of the first subword and of the second transcoded subword.

Thus, in order to improve the performance of the entropic code used to perform the transcoding of the first sequence of binary data, a parameter B defining a noise threshold B as a number of low-order bits considered to be drowned in noise, and not therefore verifying the optimum statistics of a decorrelated signal, is used. On the basis of this parameter B, a more performant method for entropic transcoding is defined, wherein, since the B first low-order bits of each word are considered as not apparently verifying the statistics suited to the application of an entropic code, they are excluded from this encoding, which applies only to a high-order part of the word, in such a way as to optimise the use of the entropic code.

Optionally, the application of the predetermined entropic code to the second subword includes the following steps:

if the second subword does not consist of bits all of which are identical, the position, marked from the end of lowest-order of the second subword, of its lowest-order bit, called the reference bit, beyond which all the higher-order bits of the second subword are identical is determined, the second transcoded subword is obtained by concatenation of a number of bits of a predetermined equal value, where this number corresponds to the said determined position, of a bit at a value complementary to the said predetermined equal value, of a bit defined according to the sign of the word, and of the bits of the second subword of lower order than its reference bit.

Also optionally, if the second transcoded subword consists of bits all of which are identical, the entropic code attributes to it a transcoded word of two bits, the first of which is at the said complementary value, and the second at a value defined according to the sign bit of the word.

Also optionally, a method for entropic transcoding according to the invention may further include the following steps:
  prior determination of the said predetermined number B of low-order bits considered as representative of a noise level of the words of the first sequence of binary data,
  supply of the said second compressed sequence of binary data with the said number B.

Also optionally, the said predetermined number B of low-order bits considered as representative of a noise level of the words of the first sequence of binary data is chosen as being the integer part of the average of the positions of the lowest-order bit, beyond which all the higher-order bits have a same predetermined value, of the words of the said first sequence of binary data.

Another object of the invention is a method for block-encoding of a raster image of pixels consisting of multiple separate blocks, including a step of successive two-dimensional decompositions of the blocks of this image in a base of discrete functions predetermined using a combined application of a one-dimensional kernel for vertical decomposition of n pixels and of a one-dimensional kernel for horizontal decomposition of p pixels, where the horizontal direction of the blocks is defined as being that of the lines of the raster image in a line-by-line sequential read mode and/or transmission mode of the raster image, wherein:
  the horizontal dimension P as a number of pixels of each block is determined as being a multiple of p, $P=k \cdot p$, and a decomposition at $\log_p(P)$ level(s) of resolution is accomplished using the one-dimensional horizontal decomposition kernel,
  the vertical dimension N as a number of pixels of each block is determined as being a multiple of n, $N=l \cdot n$, and a decomposition at $\log_n(N)$ level(s) of resolution is accomplished using the one-dimensional vertical decomposition kernel, and
  for given values of n and p, the values of k and l are chosen such that the vertical dimension N is strictly less than the horizontal dimension P,
and wherein a method for entropic transcoding as previously defined is applied to a first sequence of binary data supplied by the said step of successive two-dimensional decompositions of the blocks of the image.

Another object of the invention is an image capture device including means for reading of values of the pixels of an image and means for block-encoding of these values for supplying a first sequence of binary data, wherein the said encoding means are further designed for the execution of the steps of a method for entropic transcoding or for block-encoding as previously defined.

Optionally, an image capture device according to the invention may include an imaging circuit, for the capture of images and the analog/digital conversion of these captured images, and a coprocessor circuit different from the imaging circuit and connected electronically to the latter for digital processing of the captured images, wherein the encoding means are integrated into the imaging circuit.

Also optionally, the said encoding means include two cell shift registers arranged in series and linked to means for short-circuiting of part of their cells, the cells of the first shift register being loaded with the value of the word to transcode and the cells of the second shift register being loaded with bits at an equal predetermined value, with a bit at a complementary value different from the said predetermined value and with a bit at a value defined as a function of a sign bit of said word.

This image capture device is, for example, a digital camera, a digital video camera, or a mobile telecommunication device or data-processing device of some kind fitted with such an integrated camera or video camera.

Finally, another object of the invention is a computer program which can be downloaded from a communication network and/or recorded on a computer-readable medium and/or which can be executed by a processor, including program code instructions for the execution of the steps of a method for entropic transcoding or for block-encoding as previously defined, when the said program is executed on a computer.

Figure 2:
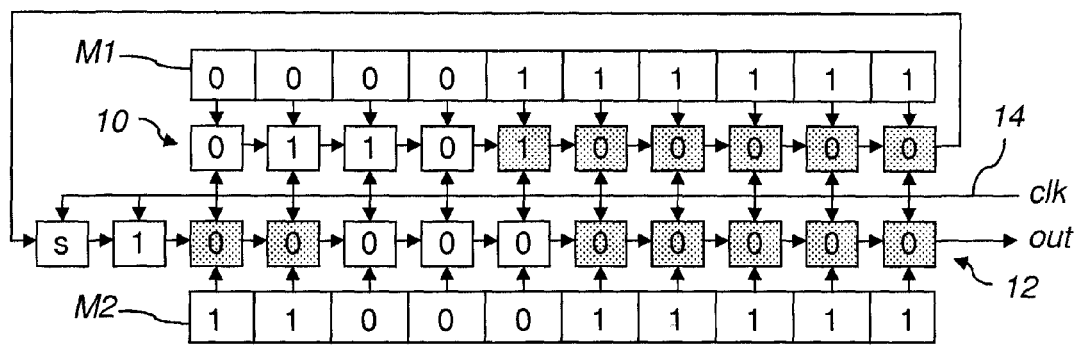
Figure 3:
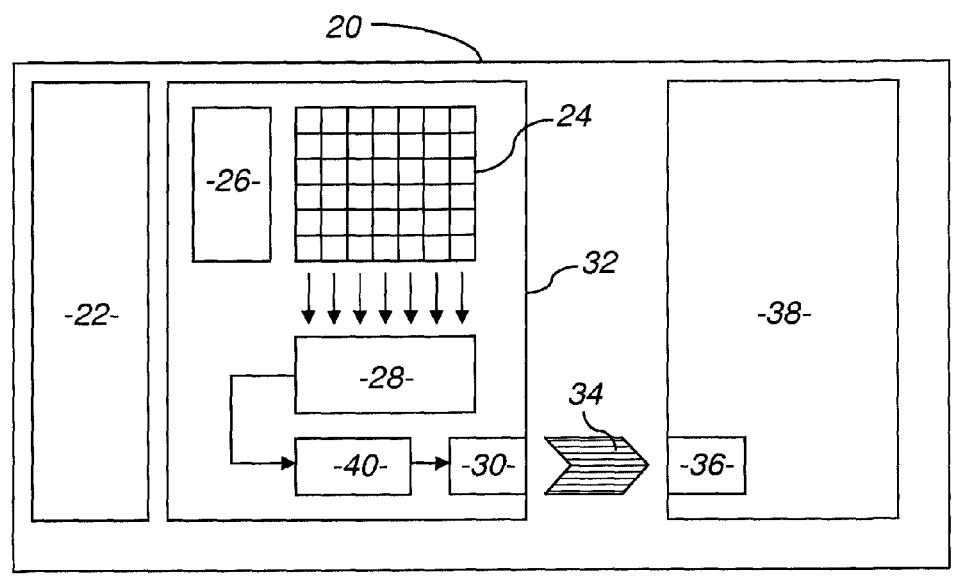
Figure 4:
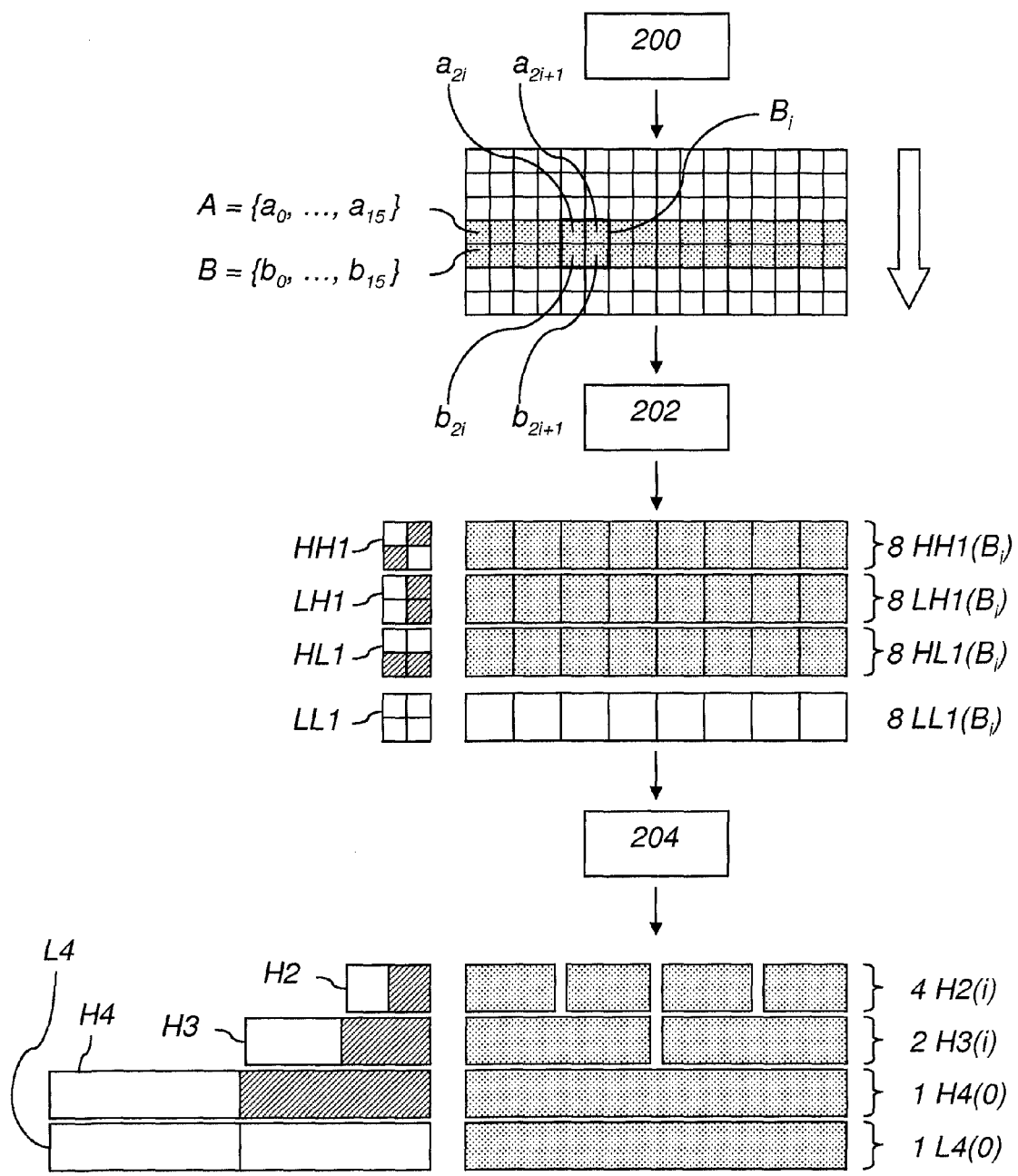
Figure 5:
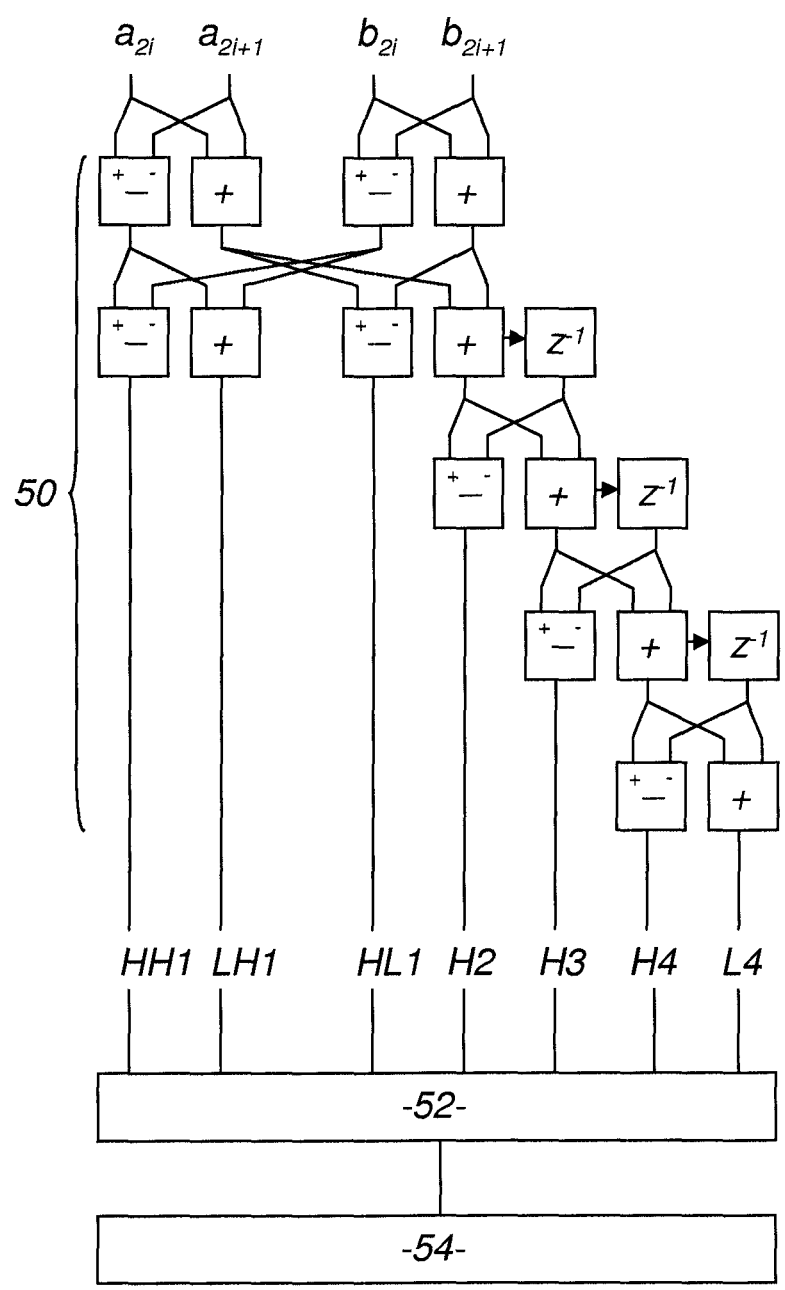

The invention will be better understood by means of the following description, given solely as an example, and made in reference to the appended illustrations, in which:

FIG. 1 illustrates the successive steps of a transcoding method according to an embodiment of the invention, FIG. 2 illustrates an example of installation of the method of FIG. 1 using shift registers, FIG. 3 represents diagrammatically the general structure of an optical image capturing module according to an embodiment of the invention, FIG. 4 illustrates the successive steps of a method for block-encoding which can be implemented by the optical module of FIG. 3, FIG. 5 illustrates an example of installation of the method of FIG. 4 using adders and subtracters.

According to a first aspect of the invention, a new method for entropic transcoding is firstly proposed. According to an embodiment of the invention, it uses an entropic code particularly suited to sequences of binary data derived from a decorrelating block-encoding of images. It can thus be implemented by an encoder that performs such a decorrelation, followed by a quantification if applicable, then by the entropic transcoding itself. This encoder can be installed in various places of an image capture device.

According to a second aspect of the invention, a decorrelating block-encoding of images, advantageously applied before the above-mentioned transcoding, is also proposed.

First Aspect: Entropic Transcoding of Parameters Derived from a Decorrelating Encoding of an Initial Image, Video or Audio Signal From an initial real signal, especially an image signal, a decorrelating encoding is applied to exploit its redundancies and obtain a sequence of binary data consisting of words which define parameters with very predictable statistics.

Conventionally, this sequence of binary data consists of a succession of words, where each word comprises a sign bit and a constant predetermined number of bits to define the value of a corresponding coefficient. As above-mentioned, as a result of the decorrelation, the value of a coefficient is more probable the closer it is to zero.

An example of a suitable entropic code to transcode this sequence of binary data is as follows:
- if the value of a word is zero, the entropic code attributes to it a transcoded word of two bits, the first of which is at "1" and the second of which has the value of the sign of the word,
- if the value of a word is non-zero, the position of its highest-order bit at "1" is determined such that the entropic code attributes to it a transcoded word obtained by concatenation of a number of bits at "0" corresponding to the said determined position, of a bit at "1", of the bit of the sign of the word and of the bits of the word of an order lower than its highest-order bit at "1".

In other words, this entropic code consists, for a fixed-size word, in encoding the position of its highest-order bit at "1" and its sign using a variable-size code, and then in concatenating the bits of the word of order lower than this bit at highest-order "1" with the variable-size code.

More tangibly, the principle of this entropic code is provided in the following table, in which S designates the sign bit of the binary word to be transcoded:

| value of coefficient | binary word | transcoded word |
| --- | --- | --- |
| 0 | S000 . . . 0000 | 1S |
| +1, −1 | S000 . . . 0001 | 01S |
| +2, +3, −2, −3 | S000 . . . 001X | 001SX |
| +4, +5, +6, +7, −4, −5, −6, −7 | S000 . . . 01XY | 0001SXY |
| more generally | position of the highest-order bit at 1 is n | <n zeros> 1S <(n − 1) low-order bits> |

A check is made that, for each transcoded word, the number of "0s" before the first "1" enables the size of the complete transcoded word to be defined. The transcoded words are therefore separable if they are read in series in a sequence of transcoded binary data.

This entropic code results from binary logic operations accomplished on binary words. Accordingly, the skilled man in the art will understand that a variant of this code, consisting in accomplishing complementary binary logic operations on two's complements of the binary words, operates in the same way. Similarly, in the previous example, by convention it was chosen to encode the position of the highest bit at "1" using bits at "0" the number of which is equal to this position. The skilled man in the art will also understand that a variant of this code, consisting in choosing another convention, operates in the same way.

It is therefore possible to define this entropic code as forming part of a family of equivalent entropic codes including the following general steps:
- if a word does not consist of bits all of which are identical, the position of its lowest-order bit, called the reference bit, beyond which all the higher-order bits of the word are identical is determined, such that the entropic code attributes to it a transcoded word obtained by concatenation of a number of bits of a predetermined equal value, where this number is equal to the said determined position, of a bit at a value complementary to the said predetermined equal value, of a bit defined according to the sign of the word, and of the bits of the word of lower order than its reference bit,
- if a word consists of bits all of which are identical, the entropic code attributes to it a transcoded word of two bits, the first of which is at the said complementary value, and the second at a value defined according to the sign of the word.

As previously indicated, this entropic code, like any other entropic code which is suited to sequences of binary data obtained by decorrelation of an image, video or audio real signal, is however not very compatible with the genuine variability of the statistics derived from real images, videos or sounds notably due to the noise present in the low-order bits of the coefficients obtained from unprocessed real signals. Thus, if it were applied directly to words of these sequences of binary data, it would not result in an optimum compression.

In order to improve the performance of the entropic code, a parameter B defining a noise threshold B as a number of low-order bits considered to be drowned in noise, and not therefore verifying the optimum statistics of a decorrelated image, video or audio signal, is used.

On the basis of this parameter B, a new method is defined of entropic transcoding of a first sequence of binary data consisting of words to be transcoded into a second sequence of binary data compressed by use of the above-mentioned entropic code in order to transcode each word of the first sequence of binary data into a transcoded word. On the basis of the number B of low-order bits considered as representative of a level of noise of the words of the first sequence of binary data, it includes the application of the following steps to each word of the first sequence of binary data:
- subdivision of the word into first and second subwords, where the first subword includes the B low-order bits of the word, considered as drowned in noise, and where the second subword includes the other high-order bits of the word,
- application of the abovementioned entropic code to the second subword in order to obtain a second transcoded subword, and
- obtaining the final transcoded word by concatenation of the first subword and of the second transcoded subword.

As an example, for B=3, application of this improvement to the previously mentioned entropic code gives, tangibly, the following transcoding table, in which the b symbols designate the bits considered to be drowned in noise:

| binary word | transcoded word |
| --- | --- |
| S000 . . . 000bbb | 1Sbbb |
| S000 . . . 001bbb | 01Sbbb |
| S000 . . . 01Xbbb | 001SXbbb |
| S000 . . . 1XYbbb | 0001SXYbbb |

This improvement could also be applied in the same way to another entropic code adapted for transcoding of sequences of binary data originating from the decorrelation of a real image, video or audio signal.

In an advantageous but non-obligatory manner, the number B is determined for each sequence of binary data in question, according to statistical parameters of this sequence of binary data. This makes the transcoding advantageously adaptive. After transcoding of the sequence of binary data, the number B must then be provided with the transcoded sequence of data in order to allow a reverse transformation of the signal.

For example, the number B of low-order bits representative of a level of noise of the words of a sequence of binary data is chosen as being the integer part of the average of the positions of the highest-order bit at "1" of the words of this sequence of binary data.

In complementary binary logic or by convention, B could be chosen as being the integer part of the average of the positions of the highest-order bit at "0" of the words of this sequence of binary data.

Thus, expressed in more general terms, B is chosen as being the integer part of the average of the positions of the reference bit of the words of this sequence of binary data.

More accurately, a succession of steps executed by a transcoding method according to the invention is illustrated in FIG. 1.

In the course of a first step 100 a transcoding block receives, in the form of a first sequence of binary data, a digital signal decorrelated by an encoder and consisting of coefficients which may possibly be quantified.

In the course of a following step 102, a statistical calculation is made on the words of this first sequence of binary data to determine the value of B as integer part of the average of the positions of the highest-order bit at "1" of these words. Purely as an illustration, B is for example evaluated at 2.

After this, in the course of a step 104, an iterative loop is started on all the words of the first sequence of binary data in order to transcode each of them. Each of the words consists, for example, of a bit of sign s and of ten bits defining the value of a coefficient. Purely as an illustration, a word "s0000010110" is used as an example.

In the course of a following step 106 this word is divided into two subwords. The first subword comprises the B=2 low-order bits of the word, considered to be drowned in noise, in this case "10". The second subword comprises the other high-order bits of the word and its sign bit s, i.e. "s00000101".

In the course of a following step 108, the previously mentioned entropic code is applied to the second subword. The position of its highest-order bit at "1" is 3, such that the entropic code attributes to it a second transcoded subword obtained by concatenation of three bits at "0", of one bit at "1", of the sign bit s and of the bits of the second subword of order lower than its highest-order bit at "1". This gives the following transcoded second subword: "0001s01".

Finally, in the course of a step 110, a transcoded word corresponding to the word "s0000010110" is obtained by concatenation of the second transcoded subword and of the first subword. This finally gives "0001s0110".

The method is repeated in step 104 until all the words of the first sequence of binary data are transcoded.

A final step 112 is then commenced, to end the transcoding by supplying a second sequence of transcoded binary data, consisting of the words previously transcoded, with the value of B encoded over a predetermined number of bits. The transmission of B and of the second sequence of transcoded binary data is sufficient, indeed, to recover the coefficients of the decorrelated signal.

FIG. 2 illustrates an example of a possible architecture to implement the above described transcoding method, when the previously defined entropic code is applied.

The proposed architecture includes two shift registers 10 and 12 arranged in series. Each shift register consists of cells including, except for the first, an "in" input linked to an "out" output of the previous cell. In addition, the "in" input of the first cell of the second shift register 12 is linked to the output of the final cell of the first shift register 10.

Each cell of each shift register is further linked to a circuit 14 providing a clock signal which, at each clock stroke k, causes the input of each cell to be transferred to its output using the relationship out (k)=in (k−1), for a sequential reading of the content of registers 10 and 12. Finally, and originally, each cell of each shift register includes an additional control input which enables this cell to be short-circuited when it is, for example, set at "1". In other words, when the short circuit is activated for a cell, out (k)=in (k) and the value carried by this cell is not read. The particular architecture illustrated in FIG. 2 is suitable for the transcoding of words of ten value bits and one sign bit. It is represented in the particular case of the processing of the word "s0000010110", transcoding of which has been explained previously.

The first shift register 10 comprises as many cells as there are value bits of the word to be processed, i.e. ten cells. They are loaded with the value of the word, with the first cell carrying the lowest-order bit and the last the highest-order bit.

The second shift register 12 comprises two cells more than the first. Its first two cells are loaded respectively with the sign bit of the word and with "1". The following ten are loaded with "0".

In complementary logic or according to the chosen conventions, the values of the cells of the registers will, of course, be modified according to the implemented entropic code variant.

The control inputs of the ten cells of the first shift register 10 are supplied respectively by ten bits of a first short-circuit word M1. The control inputs of the ten cells loaded with "0" of the second shift register 12 are supplied respectively by ten bits of a second short-circuit word M2.

The first and second words M1 and M2 are defined on the basis of the value of B and the position n of the highest bit at "1" of the word to be transcoded.

To accomplish this a first intermediate word Mi1 is defined carrying, in binary format and over ten bits, the value $2^B-1$. For example, if B is equal to 2, Mi1 is equal to "0000000011". A second intermediate word Mi2 is also defined carrying, in binary format and over ten bits, the value $2^n-1$. For example, for the word "s0000010110", n is equal to 5. Mi2 is therefore equal to "0000011111". It will also be noted that Mi2/2 is equal to "0000001111", which corresponds to a shift towards the low-order bits of Mi2.

In practice the second intermediate word Mi2 is obtained very easily from the word to be transcoded. Its highest bit is set to the value of the highest bit of the word to be transcoded and there is an iteration towards the lower-order bits using an OR logical relationship between its bit of rank n and the bit of rank n−1 of the word to be transcoded to define the value of its bit of rank n−1.

The first word M1 is then defined by the following logical relationship:

$$M1 = \text{NOT}(Mi2/2 \text{ OR } Mi1).$$

In the example illustrated in FIG. 6 this gives:
M1=NOT ("0000001111" OR "0000000011"),
M1=NOT ("0000001111"),
M1="1111110000".

The second word M2 is defined by the following logical relationship:

$$M2 = (\text{NOT } Mi2) \text{ OR } Mi1.$$

In the example illustrated in FIG. 6 this gives:
M2=(NOT "0000011111") OR "0000000011",
M2="1111100000" OR "0000000011",
M2="1111100011".

In FIG. 2, the words M1 and M2 are represented from left to right in the ascending direction of the order of their bits. Whenever they have a bit at "1", they short circuit the corresponding cell, which is then represented in grey. Since the values of the grey cells are not transmitted by both shift registers in series, it can be seen, moving back up the cells from the last cell of the second register 12 to the first cell of the first register 10, that the transcoded word supplied sequentially at the output from the second shift register 12 takes, in this example, the value "0001s0110".

It clearly appears that the improved method of transcoding through use of an entropic code such as the one previously described remains efficient even in the presence of sequences of binary data carrying decorrelated but noisy values.

When, in addition, the value of B is calculated automatically from statistical data extracted from sequences of binary data, this makes this transcoding method adaptive, which is particularly advantageous. Since parameter B is intended to take quite a low value (i.e. it quantifies a level of noise as a number of bits which are apparently drowned in noise), it can also itself be encoded over a small number of bits, for example three. The additional cost of the adaptive property of the transcoding method is therefore negligible. It will also be noted that the value of B may be determined out of hand, without resulting from a particular statistical calculation.

The previously described transcoding method can be implemented in a digital image-capture device, an optical module of which is represented in FIG. 3.

It will be noted that this image capture device is, for example, a digital camera, a digital video camera, or a mobile telecommunication device or data-processing device of some kind fitted with such an integrated camera or video camera.

In this figure, an optical module 20 of a sensor, for example a CMOS sensor, includes an optical unit 22 and a matrix 24 of sensitive elements, the photodiodes, which, associated with unrepresented electrical reading means, form pixels of an image to be captured.

The matrix of pixels 24 is associated with a sequencing device 26 and with an analog/digital conversion device 28, allowing the acquisition of a digital raster image of pixels. The matrix of pixels 24, the sequencing device 26 and the analog/digital conversion device 28 form, with an interface 30 for transmission of the acquired digital images, an electronic circuit 32 generally called an "imaging circuit" or "focal plane" of the CMOS sensor.

The interface 30 of the imaging circuit 32 is, moreover, generally connected by an electronic physical link 34 to the interface 36 for reception of digital images of a graphical coprocessor circuit 38 which allows algorithms to be implemented to improve the quality of the acquired digital images, and possibly to implement a decorrelating encoding method such as one of those mentioned above.

The image acquisition devices intended for the consumer market, such as digital cameras or digital video cameras with CMOS sensor, or the optical modules of mobile telephones, are subject to many constraints.

In particular, the transmission rate of the electronic physical link 34 between the imaging circuit 32 and the graphical coprocessor 38 is limited. As an example, the SMIA protocol adopted by very many imaging circuits restricts the transmission rate to 400 Mbits/s. And an uncompressed video of a 2-megapixel imaging circuit, each of which is encoded over 10 bits at 30 images per second requires a transmission rate of 600 Mbits/s. This transmission rate constraint is one of the reasons for which video mode resolution is generally limited.

Moreover, the reduction of electrical power consumption is a major constraint for roaming devices, including image sensors. As one of the largest sources of consumption of these image sensors is the transfer of the digital data between the imaging circuit 32 and the graphical coprocessor circuit 38 through the electronic physical link 34, the best way of reducing this consumption proves to be to reduce the quantity of transmitted data.

Finally, the latest generations of image enhancement filters which can be integrated into the graphical coprocessor circuit 38 require that several successive images are stored. For economic reasons relating to the costs of memory, and due to the increasing quantity of raw information of the images, these algorithms cannot yet be used in low-cost devices.

The abovementioned three constraints show the need for installing an efficient encoder 40 which allows a satisfactory compression of acquired digital data to be envisaged, either in the graphical coprocessor circuit 38 to allow the use of complex filtering algorithms to be envisaged or, preferentially, in the imaging circuit 32 to limit the transmission rate transmitted by the electronic physical link 34. This encoder 40 is especially designed for implementing a decorrelating block-encoding, possibly a quantification, and then an entropic transcoding such as the previously described one.

As is represented in FIG. 3, it is advantageous to install it in the imaging circuit 32. Indeed, in this case, the transmission rate supported by the electronic physical link 34 is substantially reduced.

In FIG. 3 the encoder 40 is represented at the output of the analog/digital conversion device 28 just before the transmission interface 30. According to various implementation variants, it can also be implemented partially in the analog field, on the supply side of the analog/digital conversion device 28, in particular to perform the decorrelating block-encoding, and partially in the digital field, on the output side of the analog/digital conversion device 28, in particular to perform the entropic transcoding.

Second Aspect: Decorrelating Encoding of an Image by Decomposition Within a Predetermined Base of Discrete Functions As previously indicated, the imaging circuit 32 of the image capture device diagrammatically represented in FIG. 3 advantageously includes an encoder 40 designed for performing a decorrelating block-encoding of an image followed by a transcoding according to the invention.

However, it should be noted that the increase in spatial resolution of an image capture device, quantified by the number of megapixels of its imaging circuit, is now the main innovation criterion for consumers. Due to the cost of integrated circuits and the desire to miniaturise the optical modules, it is therefore necessary to reduce the size of the imaging circuits. The consequence of this is that every installation of a decorrelating block-encoding algorithm in an imaging circuit of an image capture device is very greatly constrained in terms of complexity.

Moreover, it is interesting to envisage an encoding method which really takes into account the specific features of the consumer market CMOS sensors, which implement, in the sequencing device 26, a method of sequential reading of the values of the pixels of an image, in a line-by-line electronic shutter mode, from the first line to the last line of the image. This method of reading by successive electronic shutterings of the lines is intended notably to compensate the lack of sensitivity of low-cost CMOS sensors.

But the electronic constraints, of size, of consumption and the need to provide a video mode, also require that the imaging circuits operate in this read mode. This in turn implies that a digital image is by necessity read line-by-line, and that the pixels of two different lines are not chronologically consistent, since they do not represent exactly the same instant of a scene.

A consequence of this operating mode is that the various lines are not completely mutually correlated, whereas the encoding principles conventionally used presuppose an identical horizontal and vertical consistency of the digital images to which they are applied. Moreover, to accomplish block-encoding, for example of 8×8 pixel size, of an image, all the necessary lines must be acquired sequentially and stored before undertaking the processing. Due to the generally limited memory in an imaging circuit this constraint poses a problem.

The enhanced encoding method which will now be detailed takes advantage of this method of image reading line-by-line from the first line to the last line of the image. Even if the previously described transcoding method can be applied to the result of a conventional decorrelating block-encoding method, it is advantageously combined to this enhanced encoding method.

Indeed, to adapt the encoding to the line-by-line sequential read mode the image is subdivided into separate rectangular-shaped blocks the vertical dimension of which is strictly less than the horizontal dimension. The horizontal direction of the image and of the blocks comprising it is defined as being that of the lines of the image in the chosen line-by-line sequential read mode. As a result, the vertical direction of the image and of the blocks comprising it is defined as being that of the columns of the image.

More specifically, the second aspect of the invention deals with a method for block-encoding of a raster image of pixels consisting of multiple separate blocks, by successive two-dimensional decompositions of the blocks of this image in a base of discrete functions predetermined using a combined application of a one-dimensional kernel for vertical decomposition of n pixels and of a one-dimensional kernel for horizontal decomposition of p pixels, wherein:

the horizontal dimension P as a number of pixels of each block is determined as being a multiple of p, P=k·p, and a decomposition at $\log_p(P)$ level(s) of resolution is accomplished using the one-dimensional horizontal decomposition kernel, the vertical dimension N as a number of pixels of each block is determined as being a multiple of n, N=l·n, and a decomposition at $\log_n(N)$ level(s) of resolution is accomplished using the one-dimensional vertical decomposition kernel, and for given values of n and p, the values of k and l are chosen such that the vertical dimension N is strictly less than the horizontal dimension P.

A "kernel" has the traditional meaning of a discrete elementary function on the basis of which is constructed the said predetermined base of discrete functions, notably by expansions (frequency variations) and/or by translations (spatial variations) of the kernel.

Moreover, in image encoding, the two-dimensional decomposition of a block of pixels into a base of discrete functions forming vectors of this base is separable horizontally and vertically. Consequently, the kernel from which the base is constructed can be considered as the combination of a horizontal one-dimensional kernel and a vertical one-dimensional kernel for the formation of horizontal "parts of vectors" and vertical "parts of vectors".

Furthermore, in the remainder of the description, the term "projection" will be used, notably in expressions such as "horizontal projection one-dimensional kernel", "vertical projection one-dimensional kernel" or "projection of order . . . ".

Indeed, in image encoding, when the two-dimensional decomposition of a block of NP pixels is accomplished within a base of NP discrete functions forming vectors of this base, the NP coefficients obtained from this decomposition are in fact the result of projections (in the mathematical sense of the term) of the block of NP pixels on each of the vectors of the base of NP discrete functions.

Consequently, in light of the foregoing, speaking of horizontal or vertical projections amounts to speaking of horizontal or vertical one-dimensional decompositions, or again of filtering operations in the horizontal or vertical direction. In fact, it can be seen that various terminologies, borrowed from the fields of signal processing, encoding and applied mathematics are commonly used to designate the same operations.

More specifically, the operations which will be designated in the remainder of the description by the concept of projections of order $\log_p(P)$ or $\log_n(N)$ are clearly decomposition operations with $\log_p(P)$ or $\log_n(N)$ level(s) of resolution, or again correspond to $\log_p(P)$ or $\log_n(N)$ consecutive filtering operations.

By limiting the number of lines of the blocks relative to the number of columns, the greater consistency of the pixels on a given line relative to the pixels of a given column, in a line-by-line sequential acquisition of the values of the pixels, is correctly taken into account. This method is therefore advantageously implemented in inexpensive image capture devices able to be used by a wide range of consumers such as the simplest CMOS sensors. Moreover, by limiting the number of lines more than the number of columns of a block, the memory of a device implementing this method is used less, and it is easier to envisage installing this method in the encoder 40 of the imaging circuit 32.

In the non-restrictive example illustrated in FIG. 4, the horizontal dimension P in number of pixels of each block is set at 16, and the vertical dimension N in number of pixels of each block is set at 2. Each block thus comprises 32 pixels divided over two successive lines.

The two-dimensional decomposition of such a block is accomplished in a base of discrete Haar wavelets. According to this base, the one-dimensional vertical and horizontal projection kernels each comprises n=p=2 pixels, as is well-known. A Haar wavelets base is chosen because the installation of such a decomposition can be accomplished simply using adders and subtracters, as will be demonstrated below and with reference to FIG. 5.

Thus, according to this example, a projection of order $\log_2(2)=1$ is accomplished vertically in each column of 2 pixels of the block. This order-1 projection consists in adding the 2 pixels in order to obtain a first low-frequency or high-entropy parameter and in subtracting them to obtain a second high-frequency or low-entropy parameter.

According to this example, also, a projection of order $\log_2(16)=4$ is accomplished horizontally in each line of 16 pixels of the block. This order-4 projection consists in:

adding the 16 pixels of the line in question two-by-two in order to obtain 8 first low-frequency or high-entropy order-1 parameters, and in subtracting them two-by-two in order to obtain 8 second high-frequency or low-entropy order-1 parameters, adding the 8 low-frequency (or high-entropy) order-1 parameters two-by-two in order to obtain 4 first low-frequency or high-entropy order-2 parameters and in subtracting them two-by-two in order to obtain 4 second high-frequency or low-entropy order-2 parameters, adding the 4 low-frequency (or high-entropy) order-2 parameters two-by-two in order to obtain 2 first low-frequency or high-entropy order-3 parameters and in subtracting them two-by-two in order to obtain 2 second high-frequency or low-entropy order-3 parameters, and adding the 2 low-frequency (or high-entropy) order-3 parameters in order to obtain a first low-frequency or high-entropy order-4 parameter and in subtracting them in order to obtain a second high-frequency or low-entropy order-4 parameter.

In equivalent fashion, according to this example, the vertical projection and the first order of the horizontal projection can be accomplished simultaneously in the form of a two-dimensional projection using a two-dimensional Haar kernel, by considering each block of 2×16 pixels as being constituted of 8 square, successive, separate sub-blocks of 2×2 pixels each. Such a projection generates a low-frequency or high-entropy parameter, and three high-frequency or low-entropy parameters per sub-block.

After this, an order-3 horizontal projection is applied to the 8 low-frequency (or high-entropy) parameters obtained.

More specifically, in the course of a first step of reading 200, the imaging circuit 32 reads sequentially a first line A, for example in line-by-line electronic shutter mode. The values of the pixels of this line are then recorded. The number of pixels in the first line A is advantageously 16 or a multiple of 16, i.e. a multiple of the horizontal dimension of a block.

After this, the imaging circuit 32 reads sequentially a second line B, for example in line-by-line electronic shutter mode.

During the reading of this second line B, a step 202 is commenced of accomplishment of a two-dimension projection on to each block of the set of both read lines A and B. In the example illustrated in FIG. 4, for the sake of simplification only, each line is considered as comprising 16 pixels: in other words, in this example which is particularly simple, but which can be extended more generally, the set of both lines A and B comprises a single block. The pixels of line A are noted $a_0, \ldots, a_{15}$ and the pixels of line B are noted $b_0, \ldots, b_{15}$.

This block of 32 pixels $a_0, \ldots, a_{15}$ and $b_0, \ldots, b_{15}$ may be considered to be constituted of 8 square sub-blocks noted $B_i$ ($0 \le i \le 7$). Each of these square sub-blocks $B_i$ comprises four pixels $a_{2i}, a_{2i+1}, b_{2i}$ and $b_{2i+1}$.

In the course of step 202 each square sub-block $B_i$ is projected in a base consisting of four Haar blocks noted respectively LL1, HL1, LH1 and HH1. These four blocks are represented in FIG. 4 by square blocks of four hatched (subtracted values) or white (added values) pixels shown for reference in the left part of the illustration of step 202, opposite the coefficients they generate.

The first Haar block LL1 represents a low-frequency component element. Bearing in mind the general properties of the images, which in fact essentially consist of mutually differing uniform zones separated by local contours, this low-frequency component element is also a high-entropy parameter. Its projection coefficient is obtained by the following calculation:

$$LL1(B_i) = a_{2i} + a_{2i+1} + b_{2i} + b_{2i+1}.$$

The second Haar block HL1 represents a high-frequency component element or, more specifically, one which is high-frequency vertically and low-frequency horizontally. Bearing in mind the general properties of the images, which in fact essentially consist of mutually differing uniform zones separated by local contours, this high-frequency component element is also a low-entropy parameter. Its projection coefficient is obtained by the following calculation:

$$HL1(B_i) = a_{2i} + a_{2i+1} - b_{2i} - b_{2i+1}.$$

The third Haar block LH1 represents a high-frequency and low-entropy component element or, more specifically, one which is high-frequency horizontally and low-frequency vertically. Its projection coefficient is obtained by the following calculation:

$$LH1(B_i) = a_{2i} - a_{2i+1} + b_{2i} - b_{2i+1}.$$

The fourth Haar block HH1 represents a high-frequency and low-entropy component element or, more specifically, one which is high-frequency horizontally and high-frequency vertically. Its projection coefficient is obtained by the following calculation:

$$HH1(B_i) = a_{2i} - a_{2i+1} - b_{2i} + b_{2i+1}.$$

The projection of all the $B_i$ square sub-blocks in the base of the abovementioned Haar blocks provides 4×8=32 coefficients. The 24 high-frequency and low-entropy coefficients are preserved (8 HL1($B_i$) coefficients, 8 LH1($B_i$) coefficients, 8 HH1($B_i$) coefficients), whereas the 8 low-frequency and high-entropy coefficients LL1($B_i$) are not preserved but are processed in the course of a step 204 for production of an order-3 horizontal projection. In the illustration of step 202 of FIG. 4, the preserved coefficients are represented in grey whereas the non-preserved coefficients are represented in white.

In the course of step 204, with a first order, each pair of coefficients {LL1 ($B_{2i}$); LL1 ($B_{2i+1}$)} is projected in a base consisting of two Haar one-dimensional blocks noted respectively L2 and H2. Only block H2 is represented in FIG. 4 by a rectangular block of two "pixels" positioned horizontally, one of which is white (added value) and the other of which is hatched (subtracted value). This H2 block is shown for reference in the left part of the illustration of step 204, opposite the coefficients which it generates and which are preserved. Since the coefficients generated by block L2 are not preserved but processed in a second order of the horizontal projection, they are not represented, and nor is block L2, for the sake of simplifying the illustration of step 204.

The first one-dimensional Haar block L2 represents a low-frequency, high-entropy component element. Its projection coefficient is obtained by the following calculation:

$$L2(i) = LL1(B_{2i}) + LL1(B_{2i+1}).$$

The second one-dimensional Haar block H2 represents a high-frequency, low-entropy component element. Its projection coefficient is obtained by the following calculation:

$$H2(i) = LL1(B_{2i}) - LL1(B_{2i+1}).$$

The projection of the four pairs of coefficients {LL1 ($B_{2i}$); LL1 ($B_{2i+1}$)} in the base of the abovementioned one-dimensional Haar blocks provides 8 coefficients. The 4 high-frequency and low-entropy coefficients are preserved (4 H2(i) coefficients), whereas the 4 low-frequency and high-entropy L2(i) coefficients are processed in a second order of the horizontal projection. In the illustration of FIG. 4, the preserved coefficients are represented in grey whereas the non-preserved coefficients are not represented.

In the second order of the horizontal projection, each pair of coefficients {L2 (2i); L2 (2i+1)} is projected in a base consisting of 2 one-dimensional Haar blocks noted respectively L3 and H3, identical to L2 and H2 but operating at a double scale. Only block H3 is represented in FIG. 4 by a rectangular block of two "pixels" shown horizontally, one of which is white (added value) and the other of which is hatched (subtracted value). This block H3 is shown for reference in the left part of the illustration of step 204, opposite the coefficients which it generates and which are preserved. Since the coefficients generated by block L3 are not preserved but processed in a third order of the horizontal projection, they are not represented, and nor is block L3, for the sake of simplifying the illustration of step 204.

The first one-dimensional Haar block L3 represents a low-frequency, high-entropy component element. Its projection coefficient is obtained by the following calculation:

$$L3(i) = L2(2i) + L2(2i+1).$$

The second one-dimensional Haar block H3 represents a high-frequency, low-entropy component element. Its projection coefficient is obtained by the following calculation:

$$H3(i) = L2(2i) - L2(2i+1).$$

The projection of both pairs of coefficients {L2 (2i); L2 (2i+1)} in the base of the abovementioned one-dimensional Haar blocks provides 4 coefficients. Both the high-frequency and low-entropy coefficients are preserved (2 H3(i) coefficients), whereas the 2 low-frequency and high-entropy L3(i) coefficients are processed in a third order of the horizontal projection. In the illustration of FIG. 4, the preserved coefficients are represented in grey whereas the non-preserved coefficients are not represented.

In the third order of the horizontal projection, both the L3(0) and L3(1) coefficients are projected in a base consisting of two one-dimensional Haar blocks noted respectively L4 and H4, identical to L3 and H3 but operating at a double scale. Block H4 is represented in FIG. 4 by a rectangular block of two "pixels" positioned horizontally, one of which is white (added value) and the other of which is hatched (subtracted value). This H4 block is shown for reference in the left part of the illustration of step 204, opposite the coefficient which it generates and which is preserved. Block L4 is represented in FIG. 4 by a rectangular block of two white "pixels" positioned horizontally (added values). This block L4 is shown for reference in the left part of the illustration of step 204, opposite the coefficient which it generates and which is preserved.

The first one-dimensional Haar block L4 represents a low-frequency, high-entropy component element. Its projection coefficient is obtained by the following calculation:

$$L4(0)=L3(0)+L3(1).$$

The second one-dimensional Haar block H4 represents a high-frequency, low-entropy component element. Its projection coefficient is obtained by the following calculation:

$$H4(0)=L3(0)-L3(1).$$

The projection of both L3(0) and L3(1) coefficients in the base of the abovementioned one-dimensional Haar blocks provides 2 coefficients H4(0) and L4(0). Both these coefficients are preserved and represented in grey in FIG. 4.

In conclusion, 8 HH1($B_i$) coefficients, 8 LH1($B_i$) coefficients, 8 HL1($B_i$) coefficients, 4 H2(i) coefficients, 2 H3(i) coefficients, 1 H4(0) coefficient and 1 L4(0) coefficient, i.e. 32 coefficients, are preserved. A reversible transformation has thus been accomplished, forming a lossless encoding which provides a single high-entropy coefficient, coefficient L4(0) which represents the average of the pixels of the block in question.

FIG. 5 illustrates an example of possible architecture to implement the method described above.

A first stage 50 of the proposed architecture includes adders, represented by "+" symbols, subtracters, represented by "−" symbols and memory elements, each of which is the size of a single coefficient, and represented by "$z^{-1}$" symbols. This first stage 50 accomplishes steps 202, 204 as described above and provides, at output, and as the pixels of line B are read, the HH1($B_i$), LH1($B_i$), HL1($B_i$), H2(i), H3(i), H4(0) and L4(0) coefficients (noted HH1, LH1, HL1, H2, H3, H4 and L4 in FIG. 5 and in the remainder of the description, for the sake of simplification). It will be noted that, in traditional fashion, the data supplied by the adders and subtracters using the "$z^{-1}$" memory elements, i.e. those accomplishing the order-3 horizontal projection, in other words a horizontal Haar transformation over 8 parameters, is also sub-sampled at each order of the transformation, such that there are finally as many coefficients resulting from the two-dimensional decomposition as there are original pixels.

After this, the HH1, LH1, HL1, H2, H3, H4 and L4 coefficients obtained by this two-dimensional decomposition of each block are, if applicable, quantified in a quantification block 52 implementing an encoding with losses.

At the output of this quantification block 52 or directly after stage 50 of source encoding, the coefficients are transcoded using an entropic encoding block 54 accomplishing an optimisation of the size of the sequence of binary data representing the initial image, by application of a transcoding method according to the invention.

More generally, the previously described methods can be implemented by a computer program which can be downloaded from a communication network and/or recorded on a computer-readable and/or -executable medium by a processor, including program code instructions for execution of its steps described with references to FIGS. 1 and 4.

It clearly appears that an encoding method as described above enables benefit to be derived from an image capture device with a line-by-line sequential read mode. It can be easily installed in the imaging circuit 32 of such a device, even if this circuit has limited storage space, since it requires that only a single line is recorded in order to undertake processing by blocks, where each block comprises two lines and a larger number of columns.

More generally, if permitted by the storage space of the imaging circuit 32, the number N of lines of the blocks may be increased for as long as it is possible to record N−1 lines of pixels to accomplish the encoding by blocks. By choosing a number P of columns by blocks always strictly greater than N, the advantage consisting in deriving benefit from an improved horizontal consistency of the pixels relating to the line-by-line sequential read mode is preserved, whilst optimising the use of the memory resources.

Conversely, it is also possible to reduce the vertical dimension of the blocks to a single pixel. In this limit case, the vertical projection is the application of an identity function (0-order projection with a single-pixel, one-dimensional kernel). In this case the vertical consistency of the pixels will no longer be used to compress the image, but even less storage space is used.

Furthermore, in the previous example, an encoding using Haar wavelets was presented since they involve a simple implementation. But it is possible to envisage other wavelets, or even an encoding by DCT or filtering into sub-bands over rectangular blocks. Indeed, the second aspect of the invention is not limited to an encoding by blocks and by two-dimensional decompositions in a base of discrete functions in particular, but applies to every encoding by blocks using, generally, a two-dimensional decomposition (one which may be separated horizontally and vertically) of each block in a predetermined base of discrete functions.

Finally, it is important to note that the second aspect of the invention described in detail in reference to FIGS. 4 and 5 advantageously combines with an entropic transcoding method according to the invention, notably with the embodiment described in reference to FIGS. 1 to 3 (first aspect of the invention).

But the skilled man in the art will note that the second aspect of the invention is independent of the first since it is possible to implement it without combining it with an entropic transcoding method according to the first aspect of the invention. It could equally preceed a well known transcoding method.

Conversely, the entropic transcoding method described according to the first aspect of the invention can be implemented without supply at its input of data necessarily encoded by a method according to the second aspect of the invention. It can advantageously apply to other methods for block-encoding, for example those well known in the state of the art, the purpose of which is also to decorrelate an image, video or audio signal which is initially highly correlated.

The invention claimed is:

1. A method for entropic transcoding of a first sequence of binary data words to transcode into a second compressed sequence of binary data through use of a predetermined entropic code involving a variable-length of the encoded words to transcode each word of the first sequence of binary data into a transcoded word, wherein, on basis of a predetermined number B of low-order bits considered as representative of a noise level of the words of the first sequence of binary data, the method comprising, in application to each word of the first sequence of binary data:
subdividing the word into first and second subwords, wherein the first subword comprises the B low-order bits of the word, and the second subword comprises other high-order bits of the word, through load of the bits of the word in cells of a first cell shift register linked to a first short-circuiter which short-circuits a first part of the first cell shift register, the first short-circuiter being defined on the basis of the value of number B;
applying the predetermined entropic code to the second subword to obtain a second transcoded subword, through the load of bits in the cells of a second cell shift register arranged in series with the first shift register and further linked to a second short-circuiter which short-circuits a second part of the second cell shift register, the cells of the second shift register being loaded with bits at an equal predetermined value, with a bit at a complementary value different from the predetermined value and with a bit at a value defined as a function of a sign bit of the word; and
obtaining the transcoded word by concatenation of the first subword and of the second transcoded subword, the concatenation being obtained through a sequential reading of values of the non short-circuited cells of the first and second cell shift registers arranged in series.

2. A method for entropic transcoding according to claim 1, wherein the application of the predetermined entropic code to the second subword includes:
if the second subword does not include bits all of which are identical, the position, marked from the end of lowest-order of the second subword, of its lowest-order bit, as a reference bit, beyond which all the higher-order bits of the second subword are identical is determined,
the second transcoded subword is obtained by concatenation of a number of bits of a predetermined equal value, wherein this number corresponds to the determined position, of a bit at a value complementary to the predetermined equal value, of a bit defined according to the sign of the word, and of the bits of the second subword of lower order than its reference bit.

3. A method for entropic transcoding according to claim 2, wherein, if the second transcoded subword includes bits all of which are identical, the entropic code attributes to it a transcoded word of two bits, the first of which is at the complementary value, and the second at a value defined according to the sign bit of the word.

4. A method for entropic transcoding according to claim 1, further comprising:
prior determination of the predetermined number B of low-order bits considered as representative of a noise level of the words of the first sequence of binary data; and
supply of the second compressed sequence of binary data with the number B.

5. A method for entropic transcoding according to claim 4, wherein the predetermined number B of low-order bits considered as representative of a noise level of the words of the first sequence of binary data is chosen as being the integer part of average of positions of the lowest-order bit, beyond which all the higher-order bits have a same predetermined value, of the words of the first sequence of binary data.

6. An image capture device comprising:
a pixel reader which reads values of pixels of an image; and
an encoder which block encodes the values for supplying a first sequence of binary data of words to transcode into a second compressed sequence of binary data through use of a predetermined entropic code involving a variable-length of the encoded words to transcode each word of the first sequence of binary data into a transcoded word, wherein the encoder:
subdivides the word into first and second subwords, wherein the first subword comprises B low-order bits of the word, and the second subword comprises other high-order bits of the word, through load of the bits of the word in cells of a first cell shift register linked to a first short-circuiter which short-circuits a first part of the first cell shift register, the first short-circuiter being defined on the basis of the value of a number B of low-order bits considered as representative of a noise level of the words of the first sequence of binary data;
applies the predetermined entropic code to the second subword to obtain a second transcoded subword, through the load of bits in the cells of a second cell shift register arranged in series with the first shift register and further linked to a second short-circuiter which short-circuits a second part of the second cell shift register, the cells of the second shift register being loaded with bits at an equal predetermined value, with a bit at a complementary value different from the predetermined value and with a bit at a value defined as a function of a sign bit of the word; and
obtains the transcoded word by concatenation of the first subword and of the second transcoded subword, the concatenation being obtained through a sequential reading of values of the non short-circuited cells of the first and second cell shift registers arranged in series.

7. An image capture device according to claim 6, further comprising an imaging circuit, for capture of images and the analog/digital conversion of the captured images, and a coprocessor circuit different from the imaging circuit and connected electronically to the imaging circuit for digital processing of the captured images, wherein the encoding means is integrated into the imaging circuit.

8. A non-transitory computer readable medium comprising program executable code instructions for execution of a method when executed on a computer, said method for entropic transcoding of a first sequence of binary data words to transcode into a second compressed sequence of binary data through use of a predetermined entropic code involving a variable-length of the encoded words to transcode each word of the first sequence of binary data into a transcoded word, wherein, on basis of a predetermined number B of low-order bits considered as representative of a noise level of the words of the first sequence of binary data, the method comprising, in application to each word of the first sequence of binary data:
subdividing the word into first and second subwords, wherein the first subword comprises the B low-order bits of the word, and the second subword comprises other high-order bits of the word, through load of the bits of the word in cells of a first cell shift register linked to a first short-circuiter which short-circuits a first part of the first cell shift register, the first short-circuiter being defined on the basis of the value of number B;

applying the predetermined entropic code to the second subword to obtain a second transcoded subword, through the load of bits in the cells of a second cell shift register arranged in series with the first shift register and further linked to a second short-circuiter which short-circuits a second part of the second cell shift register, the cells of the second shift register being loaded with bits at an equal predetermined value, with a bit at a complementary value different from the predetermined value and with a bit at a value defined as a function of a sign bit of the word; and obtaining the transcoded word by concatenation of the first subword and of the second transcoded subword, the concatenation being obtained through a sequential reading of values of the non short-circuited cells of the first and second cell shift registers arranged in series.

* * * * *